US010482217B2

(12) United States Patent
Poornachandran et al.

(10) Patent No.: US 10,482,217 B2
(45) Date of Patent: Nov. 19, 2019

(54) SECURE LICENSE ENFORCEMENT FOR EXPANDABLE PERIPHERALS ON IOT (SLEEPI) DEVICES (71) Applicant: McAfee, LLC, Santa Clara, CA (US)

(72) Inventors: Rajesh Poornachandran, Portland, OR (US); Ned M. Smith, Beaverton, OR (US); Sven Schrecker, Santa Clara, CA (US); William J. Lewis, North Plains, OR (US); Manoj R. Sastry, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 354 days.

(21) Appl. No.: 14/757,686

(22) Filed: Dec. 23, 2015

(65) Prior Publication Data
US 2017/0185756 A1 Jun. 29, 2017

(51) Int. Cl.
*G06F 21/10* (2013.01)
(52) U.S. Cl.
CPC .................... *G06F 21/105* (2013.01)
(58) Field of Classification Search
None
See application file for complete search history.

(56) References Cited

U.S. PATENT DOCUMENTS

| 9,191,522 | B1* | 11/2015 | Krieger | H04W 4/24 |
| 2006/0235800 | A1 | 10/2006 | Furlong et al. | |
| 2009/0199287 | A1 | 8/2009 | Vantalon et al. | |
| 2010/0251333 | A1* | 9/2010 | Miura | G06F 21/10 |
| | | | | 726/3 |
| 2012/0226915 | A1 | 9/2012 | Zollinger et al. | |
| 2014/0019587 | A1* | 1/2014 | Giladi | H04L 29/06476 |
| | | | | 709/217 |
| 2015/0201225 | A1* | 7/2015 | Yin | H04N 21/23439 |
| | | | | 725/95 |
| 2015/0261939 | A1* | 9/2015 | Arana | G06F 21/10 |
| | | | | 726/26 |
| 2017/0005790 | A1* | 1/2017 | Brockmann | H04L 9/08 |

FOREIGN PATENT DOCUMENTS

EP 2595078 A1 5/2013

OTHER PUBLICATIONS

The International Search Report and the Written Opinion of the International Searching Authority, dated Mar. 13, 2017, 14 pages.

* cited by examiner

*Primary Examiner* — Henry Tsang
(74) *Attorney, Agent, or Firm* — Hanley, Flight and Zimmerman, LLC (57) ABSTRACT

Managing playback of a media file, including detecting, while a media file is playing, a trigger mechanism indicating a change in optimal play characteristics of the media file from an original format, wherein the playback of the media file is associated with a first license, in response to detecting the trigger mechanism, instructing a trusted execution environment to request an updated license from a content provider of the media file, and upon receiving a second license for the media file, the trusted execution environment enforces play of the media file using the second license for a second format. The second license allows for the play of the media file to continue at the optimal play characteristics.

19 Claims, 7 Drawing Sheets

SECURE LICENSE ENFORCEMENT FOR EXPANDABLE PERIPHERALS ON IOT (SLEEPI) DEVICES

TECHNICAL FIELD

Embodiments described herein generally relate to media playback, and more specifically to secure license enforcement for expandable peripherals on Internet of Things (IoT) devices.

BACKGROUND ART

Today's technology allows for media content to be enjoyed over a number of computer devices. Such devices may include, for example, personal computers, laptops, television devices, cell phones, tablets, smart watches, and other devices. Media may be downloaded from a content source to be played on a device, or may be streamed from a content source to the device.

Often, the playback of the media on the device is controlled through the use of licenses. In many instances, digital rights management (DRM) is employed to monitor and control the exact playback of the media. DRM controls may be used to prevent unauthorized access to protected works. Currently, DRM controls may allow a user to access content based on a subscription, rental, or purchase. However, once a user pays to enjoy media in a first format, the user may wish to enjoy the media in a second format. Some content providers provide different formats of content at different prices. However, it may be difficult for a user to switch between formats while enjoying the content. Further, a content license is normally consulted at the point when a content key is provisioned in the display device. Billing may be committed to a payment method when the license is issued, or there may be consumption based licenses where billing occurs when content streaming begins. However it may be difficult to reverse or undo billing if the entire content isn't consumed or if a difference license is applied dynamically during content consumption.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "medium" refers to a single physical medium or a plurality of media that together store what is described as being stored on the medium.

As used herein, the term "network device" can refer to any computer system that is capable of communicating with another computer system across any type of network.

As used herein, the term "trusted device" or "trusted network device" may refer to a network device that is capable of trusted operations. A trusted device may view certain available services hosted by other trusted devices in a trusted network.

As used herein, the term "trusted execution environment" may refer to an isolated execution environment that provides a secured execution space and has an isolated secure memory.

As used herein, the term "media file" may refer to audio, video, or other media data supplied by a remote content server.

As used herein, the term "license" may refer to a copyright license, copyright information, or other controls used to manage access and playback of a media file.

In one or more embodiments, a technique is provided for dynamically modifying a format of streamed content and managing the licensing and billing for the streamed content. In one or more embodiments, a trigger mechanism may be detected. The trigger mechanism may be, for example, one or more of a user-initiated event, a detection of a change in capabilities of a device, a change in topology of a display, a change in capabilities of the network, or the like. The trigger mechanism indicates that the format of a media file currently playing is no longer the optimal format, either because of the capabilities of the devices, because a user has initiated an event indicating that a different format is used, or the like. The client device may communicate to the media file provider, such as a content server, that a different license is required. The content server may provision and send the license information needed to the device such that the device may manage playback of the media file using the updated license information. The content server may also track a portion of the media file played using each license. In one or more embodiments, each license or format may be associated with a different cost, and the content server, or another party, may provide metered billing based on the tracked portions of the media filed played using each license or format.

Figure 1:
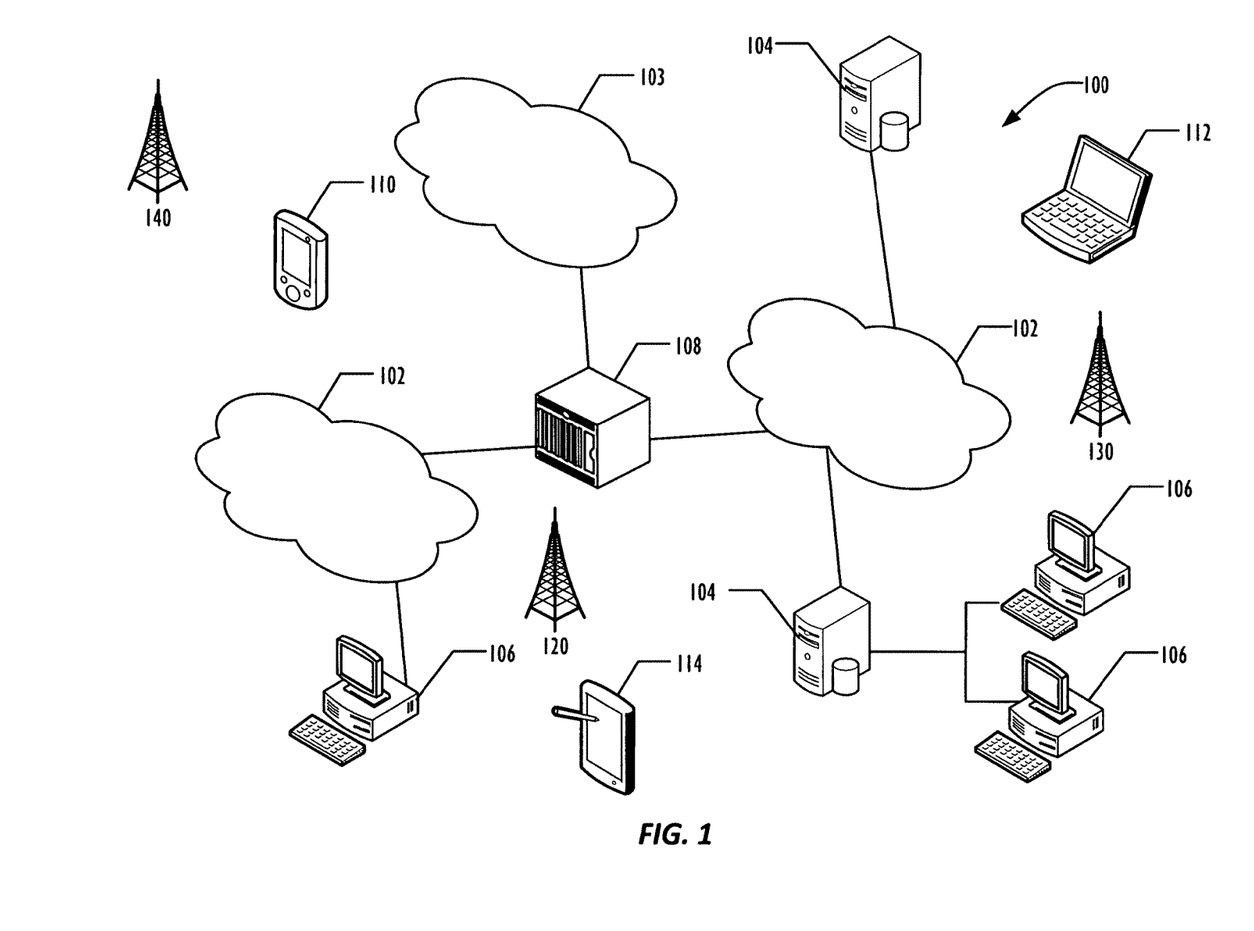
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things (microcontrollers, embedded systems, industrial control computing modules, etc.). Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

In one or more embodiments, one or more of the devices connected across network 102 may support trusted operations through the employment of a trusted execution environment (TEE). Devices in the network that support trusted operations may be referred to as trusted network devices. Trusted networks may be formed dynamically using trusted discovery which allows trusted network devices to discover other trusted network devices, or trusted network nodes, that include a trusted entity. One example is the inclusion of Intel® Manageability Engine which is available from the Intel Corporation. (INTEL is a registered trademark of Intel Corporation.) Secure license enforcement may be hardened using Trusted Execution Environment (TEE) technology, such as Intel® SGX, to protect functionality governing the expansion and contraction of the trusted network. The various engines will be explained in further detail below.

Figure 2:
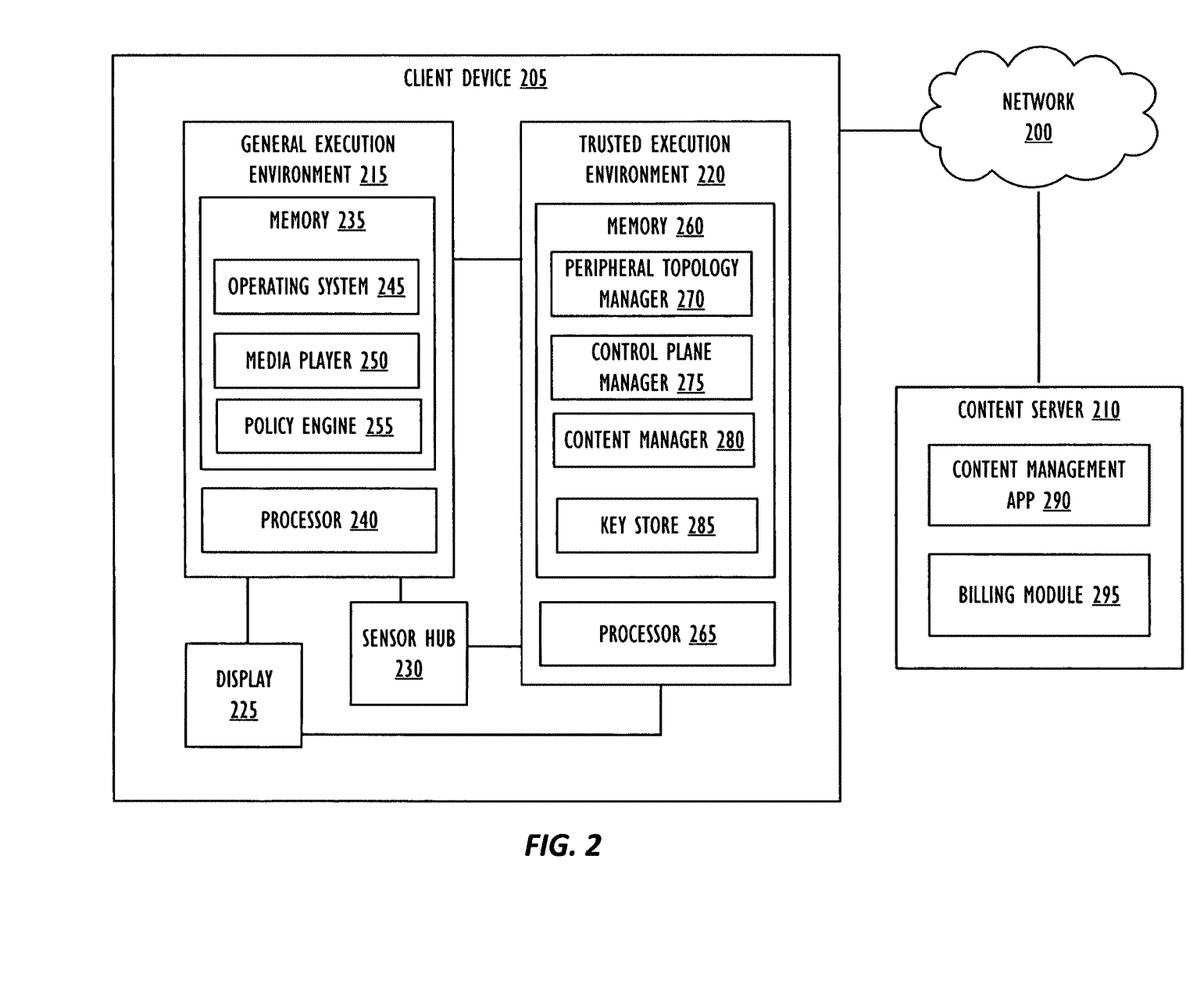
FIG. 2 is a diagram illustrating a system for secure license enforcement for expandable peripherals according to one or more embodiments.

FIG. 2 is a diagram illustrating a system for secure license enforcement, according to one or more embodiments. FIG. 2 includes two devices, client device 205 and content server 210, connected across trusted network 200. Network 200 may be any type of computer network, such as a LAN or a corporate network, including a plurality of interconnected networks. For example, Network 200 may include a subset of the devices included in larger network 102 or 103.

In one or more embodiments, client device 205 may include a general execution environment 215, as well as a trusted execution environment (TEE) 220. The client device 205 may also include a display 225, and a sensor hub 230. The general execution environment 215 may be operatively connected to the TEE 220, the display 225 and the sensor hub 230 over a bus. The display 225 and sensor hub 230 may be connected to the TEE 220 using trusted I/O over the bus. The display may be any display device for a client device. For example, the display 225 may be a cathode ray tube (CRT) display, a light-emitting diode (LED) display, an electroluminescent (ELD) display, electronic paper, plasma display panel (PDP), liquid crystal display (LCD), and the like. In addition, in one or more embodiments the display may include dynamic characteristics. For example, the display may be foldable, extendable, or otherwise include the capability of dynamically changing topology. In one or more embodiments, display 225 may be hardwired in client device 205, or may be a peripheral device connected, for example, using HDMI, wireless display, Bluetooth, or the like. In one or more embodiments, the client device 205 may include other components not shown, which may allow a user to experience a media file. For example, the client device 205 may include audio devices, such as speakers, or include the capability to connect to remote peripherals that present an audio file, such as a Bluetooth connection, wireless display capability, or the like, that allows the client device 205 to present a media file.

In one or more embodiments, sensor hub 230 detects trigger mechanisms that indicate that a current playback of a media file should be modified. In one or more embodiments, the trigger mechanisms may be user-generated. For example, if a user unfolds a foldable display, extends an extendable display, or switches display of a video file from a small screen to a larger screen (for example, by employing wireless display to switch form viewing a file on a laptop to a television), each of these events may be a trigger mechanism that indicates that the format of the media file should be played at a different resolution format. As another example, a user may begin playing the media file through a device that does not have sound capability and, thus, does not need to stream any sound for the media file. Thus, in one or more embodiments, the trigger mechanism may be dependent on a change in capabilities of the computer system, for example, a modified topology of the display. In one or more embodiments, the trigger mechanism may be more direct. For example, a user may originally begin streaming an audio or video file in a default format, but partially through the playback of the media file, wishes to view the file in a premium format. In one or more embodiments, the user may manually select to continue consuming the media file in the premium format.

In one or more embodiments, the trigger mechanism may be system- and network-dependent. For example, if a user pays to stream a media file in a premium format, but partially through the media file the system determines that due to network traffic, there is insufficient bandwidth to continue streaming the media file in the premium format, the determination may be a trigger mechanism.

The general execution environment 215 includes a memory 235 and a processor 240. The memory may include an operating system 245 and various modules or engines whose execution by the processor 240 is controlled by the operating system 245. As depicted, these modules or engines may include a media player 250 and a policy engine 255. In one or more embodiments, the media player may be any application that plays media files provided from the content server 210. The policy engine 255 may determine based on trigger mechanisms detected through the sensor hub 230 how to respond to a trigger mechanism. That is, in one or more embodiments, the policy engine 255 considers factors such as user input, system capabilities, network capabilities, and the like, and determines whether playback characteristics should be modified. For example, the policy engine 255 may determine if a higher resolution or lower resolution format is needed, or if either audio or video is needed or not needed.

TEE 220 is a trusted execution environment that provides secure services to operating system 245. In one or more embodiments, the TEE provides a secure isolated tamper resistant execution environment with dedicated storage. TEE 220 may securely communicate with other devices in the network, such as content server 210. In one or more embodiments, the TEE may include a secure out-of-band (OOB) channel dedicated to peripherals via high-bandwidth digital content protection (HDCP) communication. In one or more embodiments, the OOB secure channel may be a dedicated physical wired channel, or can be accomplished via a dedicated system management interrupt that can be handled by a system management mode handler.

In one or more embodiments, TEE 220 includes a number of modules or engines in a memory 260. As depicted, in one or more embodiments, TEE 220 may include a peripheral topology manager 270, control plane manager 275, content manager 280, and a key store 285. The peripheral topology manager 270, control plane manager 275, and content manager 280 may each include computer-readable code executable by a processor, such as processor 265.

In one or more embodiments, peripheral topology manager 270 may identify target device peripheral topology securely. In one or more embodiments, the peripheral topology manager 270 may monitor a topology of a display, such as display 225 using an OOB dedicated channel between the display 225, the sensor hub 230, and the TEE 220. The peripheral topology manager 270 may monitor for topology events that have a relevance to the license used to stream a media file. In one or more embodiments, the peripheral topology manager 270 may also manage pairing of peripheral devices to the client device 205. Control plane manager 275 may work with the peripheral topology manager 270 to dynamically enforce license constraints as expected by the content provider. In one or more embodiments, the various playback formats of a media file may be associated with various licenses, which are managed or provided by the content server 210.

The content manager 280 may work with the peripheral topology manager 270 and the control plane manager 275 to determine when to perform PAVP transcription or streaming based on the license restrictions. The peripheral topology manager 270 may inform the control plane manager 275 when a change in topology is detected that might affect a DRM license. For example, the arrival or departure of content streaming peripherals or devices, or content consumption or display peripherals may indicate a change in topology that might affect a DRM license. In one or more embodiments, the control plane manager 275 will respond to input from the peripheral topology manager 270 by attempting to establish a secure session between display controller and content streaming devices. PAVP is an example of a technology that establishes a secure control session, and may also be used to protect content between streaming devices and display devices. When a change in topology is detected, there may be a need to update or refresh the DRM license. The peripheral topology manager 270 may notify or trigger the content manager 280 with topology change information, such as display size decrease or increase, so that an appropriate DRM license may be applied.

TEE 220 may also include key store 285 in dedicated storage. Key store 285 may be stored in a secure storage device specific to the TEE 220, and separate from a storage associated with general execution environment 215. The key store 285 may include keyboxes and other data and assets useful for managing licenses. In one or more embodiments, client devices may be provisioned with multiple assets, such as keyboxes, that can be uniquely associated with a given platform topology for license acquisition or enforcement. In one or more embodiments, the key store 285 may include keys provisioned during manufacturing of the client device 205 so that the content server 210 can identify the device and its capabilities. For example, the key store 285 may include data that identifies the various topologies or other streaming capabilities of the client device 205. In one or more embodiments, the key store 285 may also store additional licensing information received from content server 210 in response to client device requesting to stream a media file in a new format.

In one or more embodiments, the various modules and engines in the general execution environment 215 and the TEE 220 may be distributed in a different manner than shown. For example, in one or more embodiments, the policy engine 255 may also be managed by the trusted execution environment 220, and the various engines and modules depicted in the TEE 220 may alternatively be executed within the general execution environment 215. Moreover, the various modules and engines could be consolidated into fewer components, or may be distributed into more components than those depicted.

Content server 210 may include content management app 290 and billing module 295. Although not shown, content server 210 may include one or more processors and memory devices which support the execution of the content management application 290 and the billing module 295. Further, in one or more embodiments, more than one server may be used for the functionality depicted in content server 210. The content server 210 may manage licenses for the distributed content. In one or more embodiments, the content server 210 may loosen or tighten playback security attributes such as encryption of content, based on a format the media file will play on. In one or more embodiments, media content may be encrypted within the media rendering pipeline using PAVP technology.

In one or more embodiments, the content management application 290 may provide media files to the client device 205. The content management application 290 may provision appropriate licenses for the media files provided. In one or more embodiments, the content management application 290 may also dynamically adjust the streaming characteristics in response receiving a request from the client device 205.

The billing module 295 may allow a content server to bill a user of the client device 205 based on dynamic streaming characteristics. In one or more embodiments, the content server 210 may monitor an amount of a media file streamed using various formats or licenses. Additionally, or alternatively, in one or more embodiments, the TEE 220 may track the amount of a media file streamed using the various formats or licenses. Because the TEE 220 is a trusted execution environment, the tracked portions of the media file are also secure. Each format or license may be linked to a certain rate. Thus, by monitoring the portions of the media file played using each format, the content server can perform, or assist in performing, metered billing. For example, if a user rents an high definition version of a movie at $4.99, but halfway through viewing the movie toggles the format to standard definition, either because of something the user has done or by a change in capabilities of the system or network, then the content server 210 has the capability to adjust the bill for the movie to compensate for the viewer not streaming the entire movie in high definition. So, for example, if the cost for standard definition of the movie is $3.99, the content server 210 may be able to bill the user for the movie at $3.50. In one or more embodiments, metered billing may be accomplished either by waiting until the end of the viewing experience to bill the user, or by refunding the user to compensate for the change in billing. If the media filed is toggled to a more expensive format, in one or more embodiments, the remainder may be billed as a second charge in one or more embodiments.

Figure 3:
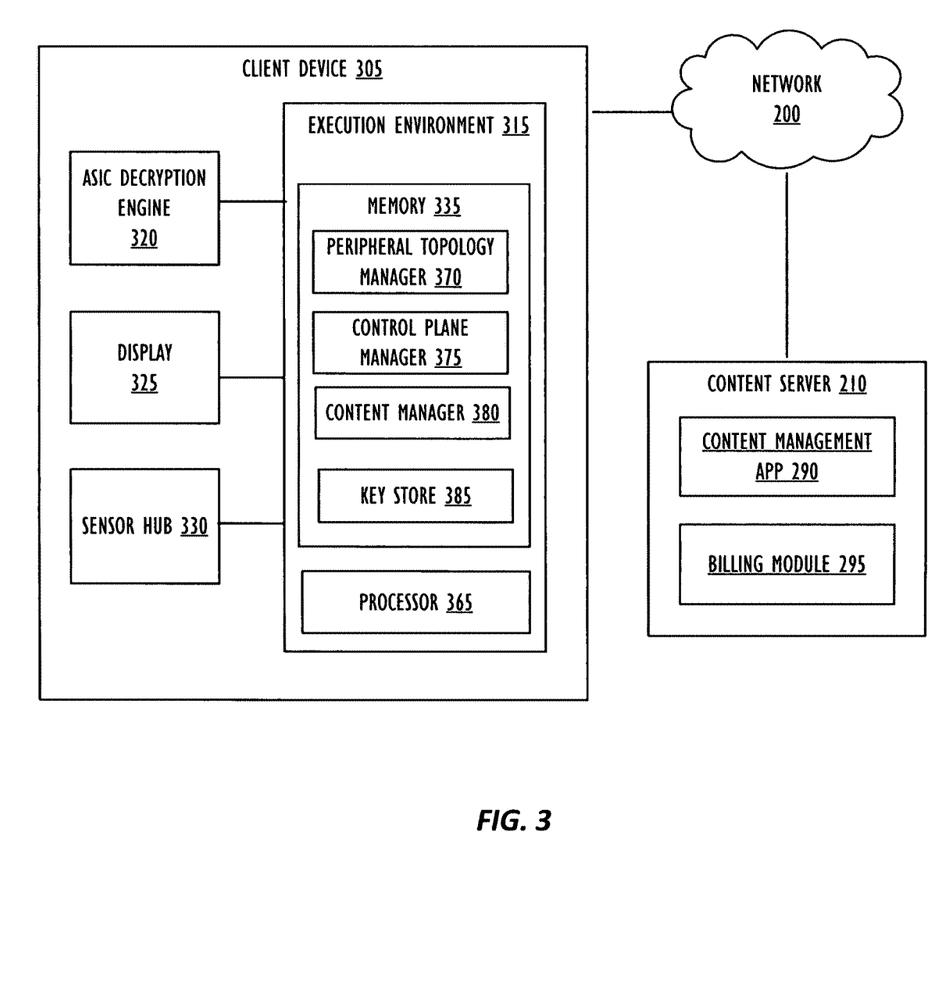
FIG. 3 is a diagram illustrating an alternate system for secure license enforcement for expandable peripherals according to one or more embodiments.

FIG. 3 is a diagram illustrating an alternate system for secure license enforcement for expandable peripherals according to one or more embodiments. In one or more embodiments, the client device 305 may be trusted endpoint for content consumption. Client device 305 may be a constrained environment, such as a smart watch or other small device that cannot support extra hardware, such as the TEE 220. In these types of devices, an application-specific integrated circuit (ASIC) 320 may be useful to provide the necessary support otherwise provided by the TEE. In constrained devices, the use of an ASIC may provide sufficient security analysis such that the device would meet security hardening criteria. Thus, the distinction between FIG. 2 and FIG. 3 lies in the architecture of the client device 305, as distinct from client device 205 in FIG. 2.

As depicted, similar to client device 205, client device 305 includes an execution environment 315, as well as a display 325 and a sensor hub 330. The execution environment 315 includes a memory 335 and a processor 365. In one or more embodiments, the memory includes a peripheral topology manager 370, a control plane manager 375, and a content manager 380. In one or more embodiments, the execution of the various modules may be performed in system management mode to preserve security. The memory 335 may also include a secure key store 385. In one or more embodiments, the key store 385 may be located in secure storage. Further, in one or more embodiments, the key store 385 may include keys and other data provisioned during manufacturing of the client device 305 that allow the content server 210 to identify the client device 305. The content server 210 may evaluate the security hardening of client device 305 and determine whether to stream content. In one or more embodiments, the content server 210 may determine that because client device 305 is likely a constrained IoT device that does not require the addition of a TEE to be secure enough for content consumption.

Figure 4:
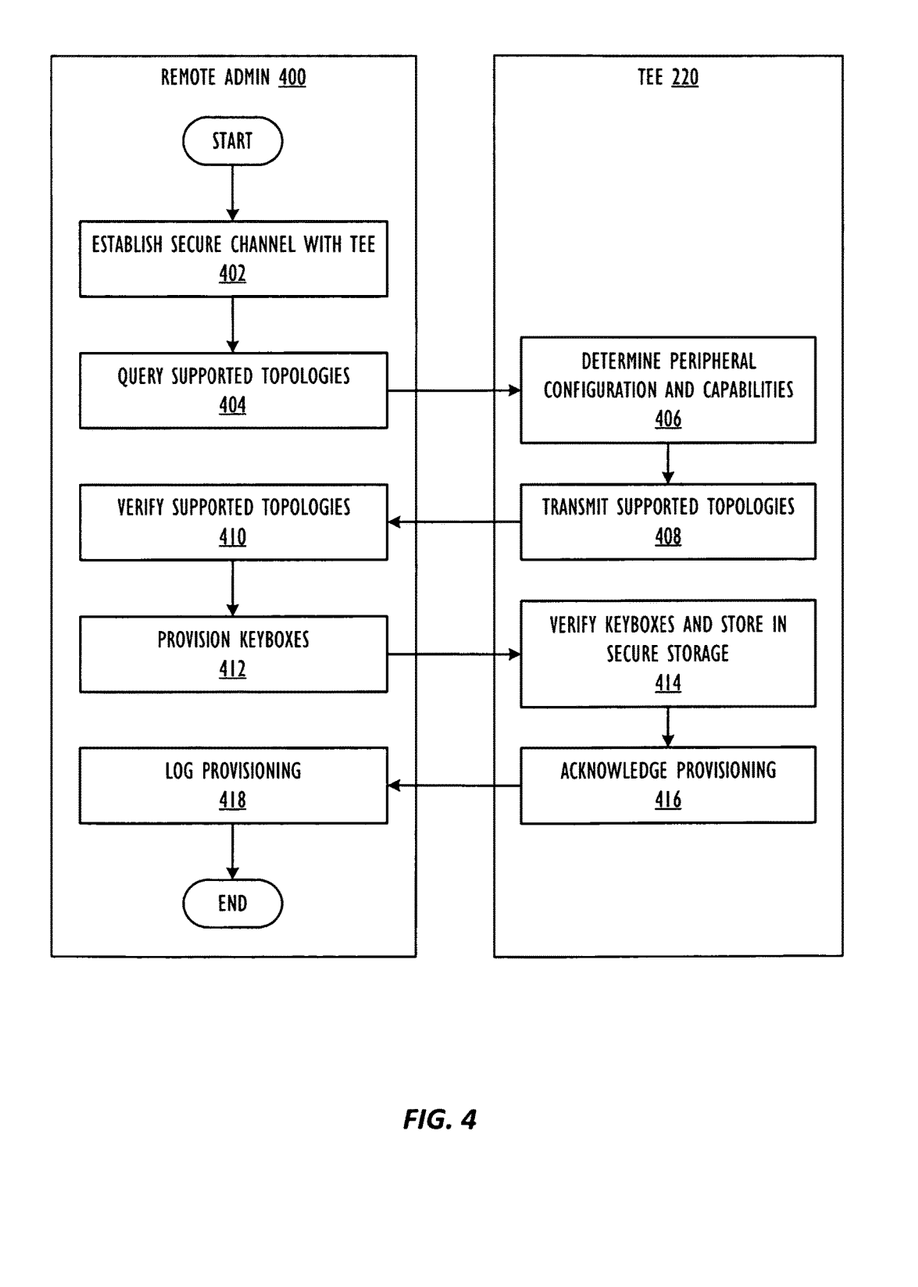
FIG. 4 is a flow diagram illustrating a technique for provisioning keys for various device topologies, according to one or more embodiments.

FIG. 4 is a flow diagram illustrating a technique for provisioning keys for various device topologies, according to one or more embodiments. FIG. 4 illustrates a method occurring between a remote admin 400 and the TEE 220. In one or more embodiments, the remote admin 400 may be the content server 210, or may be another party. The method begins at 402, and the remote admin 400 establishes a secure channel with the TEE 220 in a client device such as client device 205. In one or more embodiments, the secure channel is established using a backend interface to provide a secure communication channel between the TEE 220 and the remote admin 400. The flow diagram continues at 404 and the remote admin 400 queries the TEE 220 for supported topologies.

At 406, the TEE 220 may determine peripheral configurations and capabilities. For example, the TEE 220 may determine the various components within the client device 205 as well as peripherals operatively connected to the client device 205 that support playing media files, and determines the various combinations of configurations. For example, some peripherals, such as head mounted displays and the like may not support audio. Some displays may be foldable to support different topologies, or may be physically expandable, such as a flexible display band on a smart watch. The flow diagram continues at 408 and the TEE 220 transmits the supported topologies to the remote admin 400.

At 410, the remote admin verifies the received topologies. In one or more embodiments, the remote admin may retrieve a unique device ID that may be stored in the device from the client platform, and check with a database. In one or more embodiments, the unique ID may be provisioned during manufacturing of the device. Further, in one or more embodiments, the unique ID may be an international mobile station equipment identity (IMEI) number. The flow diagram continues at 412 and the remote admin 400 provisions keyboxes for each topology. In one or more embodiments, the remote admin 400 may provide data indicative of the client device 305 and its capabilities.

At 414, the TEE 220 verifies the keyboxes and stores them in secure storage. As discussed above, the TEE 220 includes its own secure storage separate from that accessible by the general execution environment. Once the TEE 220 verifies the keyboxes and stores the secure storage, the TEE 220 acknowledges the provisioning at 416, and at 418, the remote admin 400 logs the provisioning.

Figure 5:
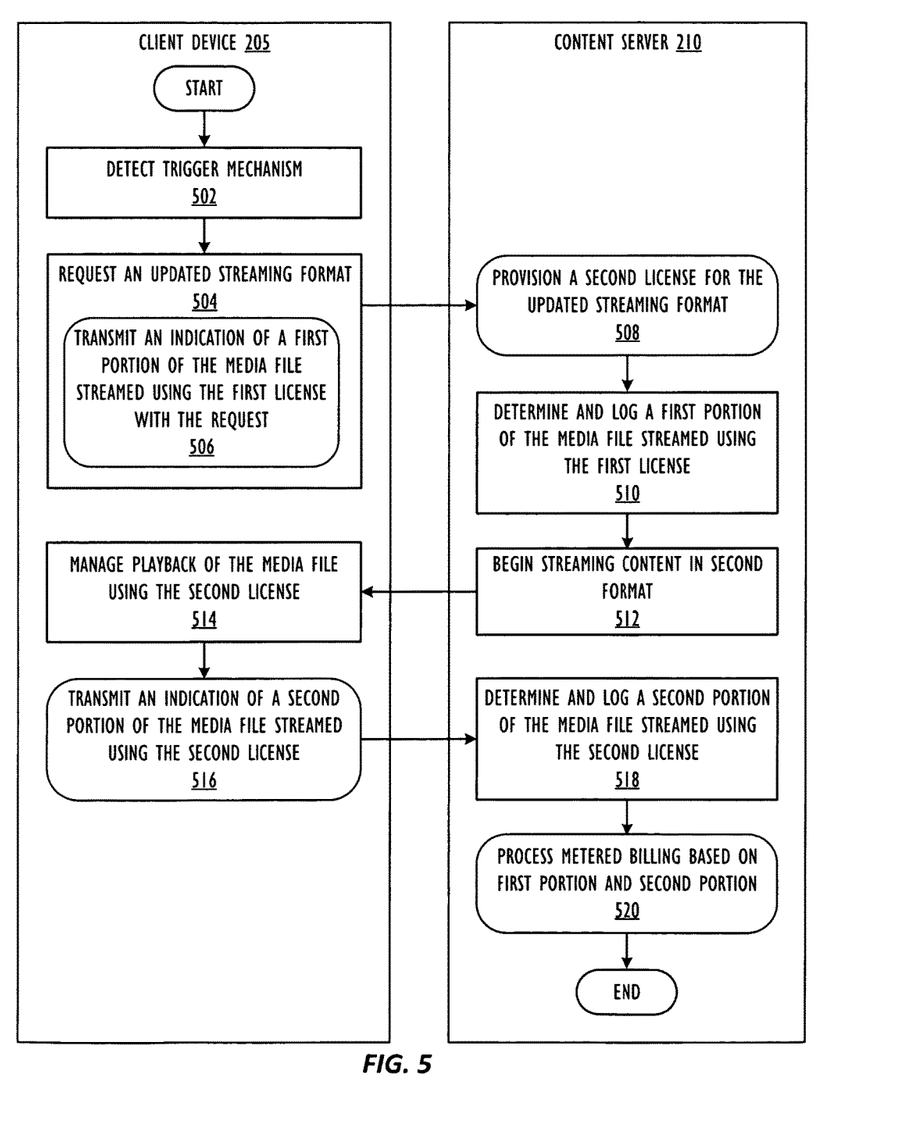
FIG. 5 is a flow diagram illustrating a technique for toggled streaming of a media file in multiple formats, according to one or more embodiments.

FIG. 5 is a flow diagram illustrating a technique for toggled streaming of a media file in multiple formats, according to one or more embodiments. The flow diagram of FIG. 5 occurs between the client device 205 and the content server 210. The flow diagram begins at 502, and the client device 205 detects a trigger mechanism. As described above, the trigger mechanism may be a user-initiated event, or may be a detected event within the system or the network, such as a change in topology or bandwidth. In one or more embodiment, the trigger event is detected based on input received from the sensor hub 230, and is processed by the policy engine 255. In one or more embodiments, the trigger mechanism may indicate a change in optimal playback characteristics based on capabilities of the devices, or user tastes. For example, if a user wishes to switch from a 1080p format to a 480p format, the 1080p format may remain technically optimal for the system, but the user request overrides may override the capabilities of the system. Thus, if a user selects to toggle from the 1080p format to the 480p format because the user wants to pay less, the 480p format becomes the optimal playback characteristic, even though the 1080p format is still the best possible format based on the device characteristics.

In response to detecting the trigger mechanism, in one or more embodiments, at 504 the client device 205 may request an updated streaming format. In one or more embodiments, the updated streaming format may be, for example, a higher quality stream, lower quality stream, or the client device may indicate that only the audio stream or video stream is needed. In one or more embodiments, the TEE 220 may sent the request to the content server 210. In one or more embodiments, at 506, the client device 205 may also transmit an indication of the portion of the media file streamed using the first format. That is, in one or more embodiments, the portions of the media file streamed using each format may be monitored by the client device 205, although the usage statistics could additionally or alternatively be monitored by the content server 210.

The flow diagram continues at 508 and the content server 210 optionally provisions a second license for the updated streaming format. In one or more embodiments, the client device 205 may already have a license for the second format, for example if the second license was provisioned as depicted in FIG. 4. The flow diagram continues at 510, and the content server 210 determines and logs a first portion of the media file streamed in the first format. As described above, the portion of the media file streamed using the first license may be monitored by the content server 210 or may be monitored by the client device 205, and provided in step 506. The flow diagram continues at 512, and the content server 210 begins streaming the media file in the second format.

The flow diagram continues at 514 and the client device 205 manages the playback of the media file using the second license 514. In one or more embodiments, a content manager 280 in the TEE 220 manages playback of the media file using the second licenses. That is, in one or more embodiments, the client device 205 uses the provisions of the second license to allow more or less access to the media file.

The flow diagram continues at 516, and the client device 205 optionally transmits an indication of a second portion of the media filed streamed using the second license. Again, the TEE 220 may provide a trusted environment to ensure the portions of the media file streamed using the various licenses or formats is secure. The flow diagram continues at 518 and the content server 510 determines and logs the second portion of the media file streamed using the second license. The flow diagram continues at 520, and the content server 210 processes metered billing based on the first portion and the second portion. In one or more embodiments, the different licenses may be associated with different billing rates, and the content server 210 may bill the user proportionally for each portion of the media file streamed using a particular license. In one or more embodiments, the content server 210 assists in metered billing by monitoring the usage statistics, such as the portion of the media file streamed using each format, and transmits the data to a billing authority who will implement the metered billing.

Figure 6:
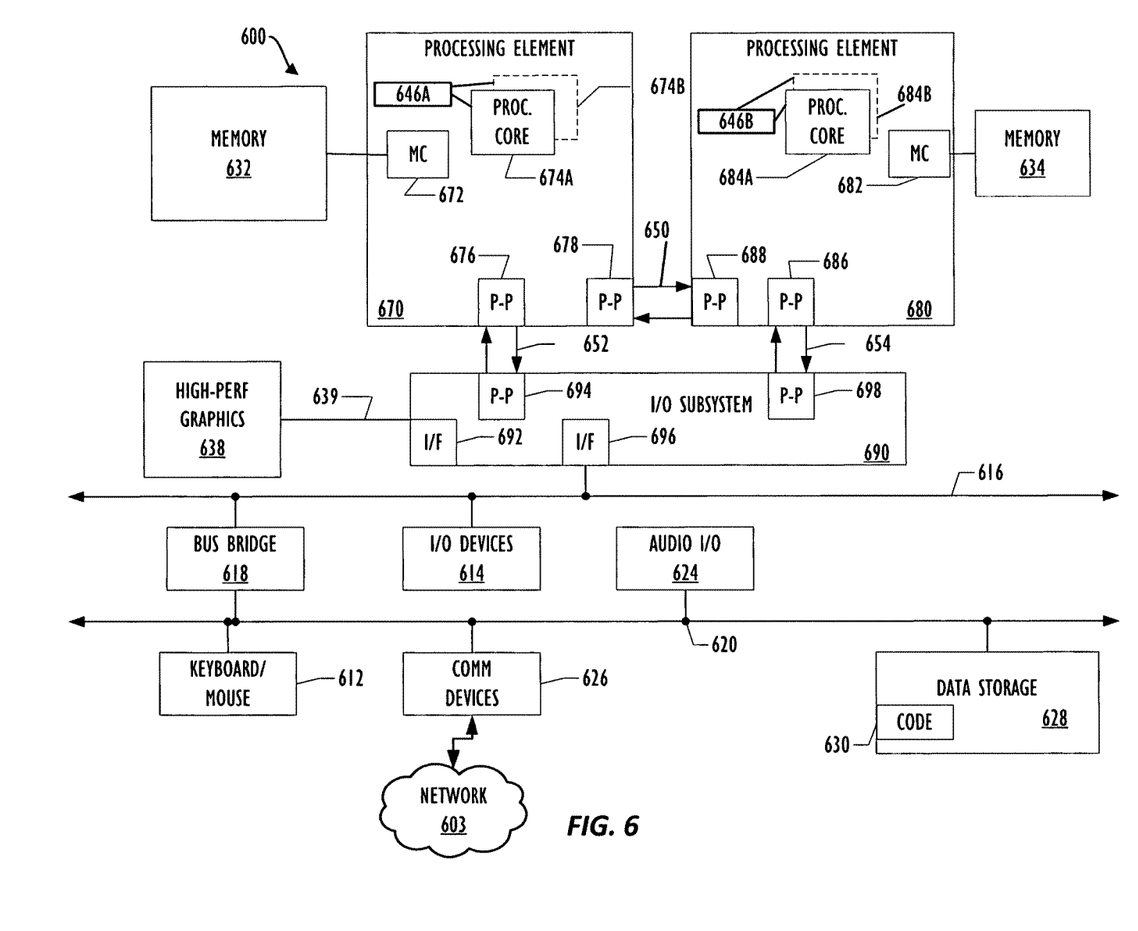
FIG. 6 is a diagram illustrating a computing device for use with techniques described herein according to one embodiment.

Referring now to FIG. 6, a block diagram illustrates a programmable device 600 that may be used within a computer device, such as client device 205, client device 305 or content server 210 in accordance with one or more embodiments. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-5. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 6, a system may implement a multi-drop bus or another such communication topology. Although links 616 and 620 are illustrated as busses in FIG. 6, any desired type of link may be used. Also, the elements of FIG. 6 may alternatively be partitioned using more or fewer integrated chips than illustrated in FIG. 6.

Figure 7:
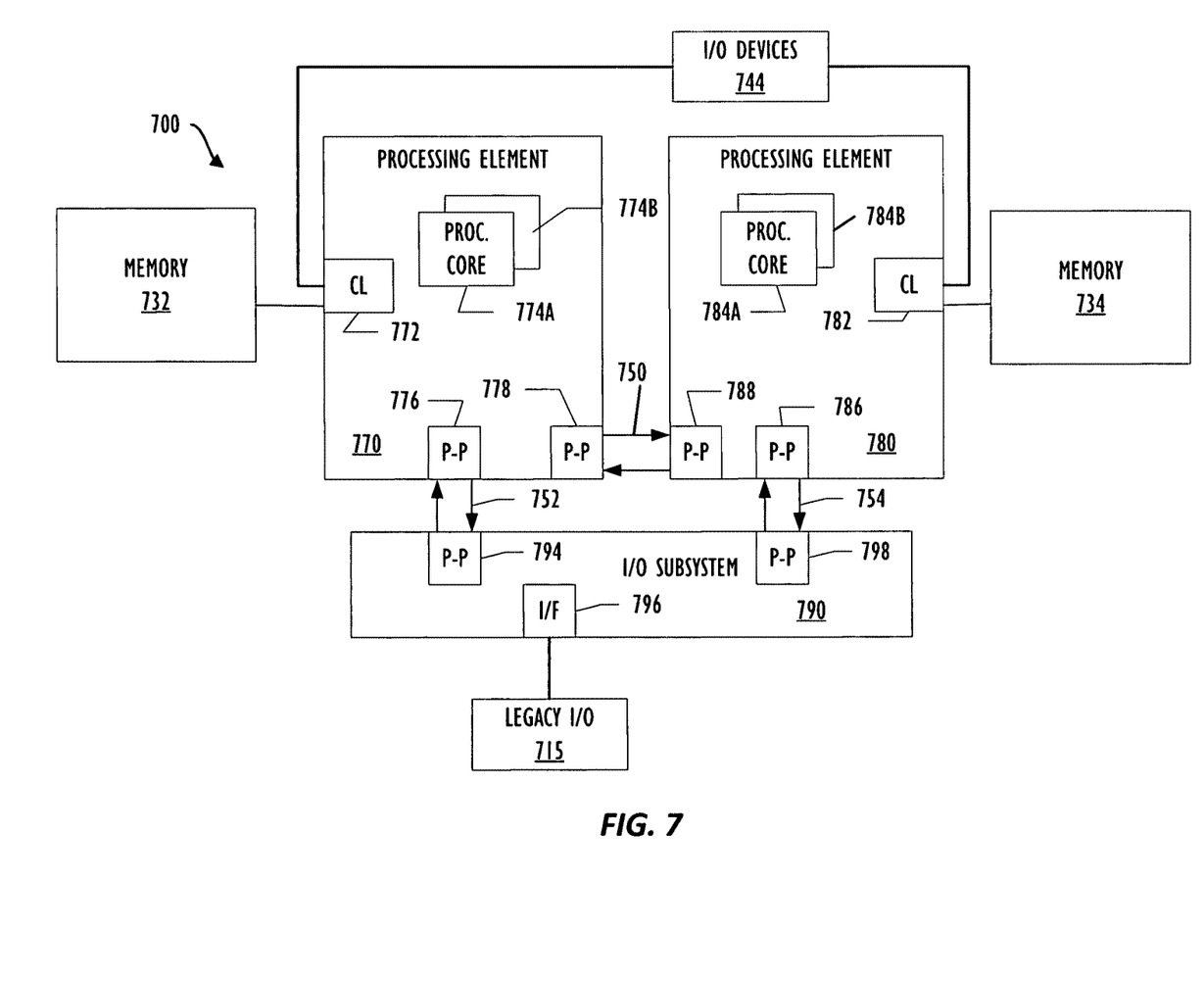
FIG. 7 is a block diagram illustrating a computing device for use with techniques described herein according to another embodiment.

Referring now to FIG. 7, a block diagram illustrates a programmable device 700 according to another embodiment. Certain aspects of FIG. 6 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A, and 78413. As illustrated in FIG. 7, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 6 and 7 are schematic illustrations of embodiments of programmable devices which may be utilized to implement various embodiments discussed herein. Various components of the programmable devices depicted in FIGS. 6 and 7 may be combined in a system-on-a-chip (SoC) architecture.

In one or more embodiments, the features described above provide a method and apparatus for dynamic robustness in negotiation and enforcement for constrained devices, such as IoT devices and wearables. The trusted channel mechanism between the TEE and the content provider may allow for a trusted mechanism to throttle streaming media based on trigger mechanisms. Further, the TEE allows for dynamic metering and content and usage analytics adjustment based on format throttling.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: detect, while a media file is playing, a trigger mechanism indicating a change in optimal play characteristics of the media file from an original format, wherein current play characteristics of the media file are associated with a first license; in response to detecting the trigger mechanism, instruct a trusted execution environment to request a second streaming format from a content provider of the media file; and upon receiving the media file in the second streaming format, the trusted execution environment enforces playing of the media file on a local device using a second license for the second streaming format, wherein the second license allows for the playing of the media file to occur at the optimal play characteristics.

Example 2 is the machine readable medium of Example 1, wherein the content provider provides the second license in response to the request for the second streaming format.

Example 3 is the machine readable medium of Example 1, wherein the content provider: determines a first portion of the media file played in the original format and a second portion of the media file played in the second streaming format.

Example 4 is the machine readable medium of Example 3, wherein the content provider: adjusts billing for the media file based on the determined first portion and the determined second portion.

Example 5 is the machine readable medium of any of Examples 1-3, wherein the trigger mechanism comprises one or more of: a detected change in screen topology, a detected user input indicating a change to the second streaming format, and a detected change in streaming capability between the content provider and the local device.

Example 6 is the machine readable medium of any of Examples 1-3, wherein the trigger mechanism comprises receiving user input requesting a change in play format.

Example 7 is a system for media play management, comprising: a trusted execution environment; one or more processors; and a memory coupled to the one or more processors and comprising instructions which, when executed by the one or more processors, cause the system to: detect, while a media file is playing, a trigger mechanism indicating a change in optimal play characteristics of the media file from an original format, wherein current play characteristics are associated with a first license; in response to detecting the trigger mechanism, instruct the trusted execution environment to request a second streaming format from a content provider of the media file; and upon receiving the media file in the second streaming format, the trusted execution environment enforces play of the media file on a local device using a second license for the second streaming format, wherein the second license allows for the playing of the media file to occur at the optimal play characteristics.

Example 8 is the system of Example 7, wherein the content provider provides the second license in response to the request for the second streaming format.

Example 9 is the system of Example 7, wherein the content provider: determines a first portion of the media file played in the original format and a second portion of the media file played in the second streaming format.

Example 10 is the system of Example 9, wherein the content provider: adjusts billing for the media file based on the determined first portion and the determined second portion.

Example 11 is the system of any of Examples 7-9, wherein the trigger mechanism comprises one or more of: a detected change in screen topology, a detected user input indicating a change to the second streaming format, and a detected change in streaming capability between the content provider and the local device.

Example 12 is the system of any of Examples 7-9, wherein the trigger mechanism comprises receiving user input requesting a change in play format.

Example 13 is a computer readable medium comprising computer readable code which, when executed by one or more computer processors, causes at least one of the computer processors to: receive, from a remote device, a request for a modified play characteristic of a media file streaming by the remote device using a first license; provision a second license for the modified play characteristic based on the request; transmit the second license to the remote device; identify a first portion of the media file streamed using the first license; store an indication of the first portion of the media file streamed using the first license; and provide the media file to the remote device, wherein the modified play characteristic of the media file is managed based on the second license.

Example 14 is the computer readable medium of Example 13, wherein: the first portion of the media file is billed to the remote device at a rate associated with the first license.

Example 15 is the computer readable medium of Example 14, wherein the first portion of the media file was streamed using the first license on a second remote device.

Example 16 is the computer readable medium of Example 14, wherein the computer readable code when executed further causes at least one of the processors to: determine a second portion of the media file streamed using the second license, wherein the second portion of the media file is billed at a rate associated with the second license.

Example 17 is the computer readable medium of any of Examples 13-14, wherein the request comprises requested play characteristics, and wherein the second license is determined based on the requested play characteristics.

Example 18 is the computer readable medium of Example 17, wherein the requested play characteristics comprise play characteristics for an updated topology.

Example 19 is a system for media play management, comprising: one or more processors; and a memory coupled to the one or more processors and comprising instructions which, when executed by at least some of the one or more processors, cause the system to: receive, from a remote device, a request for a modified play characteristic of a media file streaming by the remote device using a first license; provision a second license for the modified play characteristic based on the request; transmit the second license to the remote device; identify a first portion of the media file streamed using the first license; store an indication of the first portion of the media file streamed using the first license; and stream the media file to the remote device, wherein the modified play characteristic of the media file is managed based on the second license.

Example 20 is the system of Example 19, wherein: the first portion of the media file is billed to the remote device at a rate associated with the first license.

Example 21 is the system of Example 20, wherein the instructions further comprises instructions that when executed cause at least some of the one or more processors to: determine a second portion of the media file streamed using the second license, wherein the second portion of the media file is billed to the remote device at a rate associated with the second license.

Example 22 is the system of any of Examples 19-20, wherein the request comprises requested play characteristics, and wherein the second license is determined based on the requested play characteristics.

Example 23 is the system of Example 22, wherein the requested playback characteristics comprise play characteristics for an updated topology.

Example 24 is a method for media play management, comprising: receiving, from a remote device, a request for a modified play characteristic of a media file streaming by the remote device using a first license; provisioning a second license for the modified play characteristic based on the request; transmitting the second license to the remote device; identifying a first portion of the media file streamed using the first license; storing an indication of the first portion of the media file streamed using the first license; and streaming the media file to the remote device, wherein the modified play characteristic of the media file is managed based on the second license.

Example 25 is a system for media play management, comprising: an ASIC decryption engine; one or more processors; and a memory coupled to the one or more processors and comprising instructions which, when executed by at least some of the one or more processors, cause the system to: detect, while a media file is playing, a trigger mechanism indicating a change in optimal play characteristics of the media file from an original format, wherein current play characteristics are associated with a first license; in response to detecting the trigger mechanism, request an updated license from a content provider of the media file; and upon receiving a second license for the media file, enforce play of the media file using the second license for a second format, wherein the play of the media file is enforced at least in part by the ASIC decryption engine, and wherein the second license allows for the play of the media file to continue at the optimal play characteristics.

Example 26 is a method for license management, comprising: detecting, while a media file is playing, a trigger mechanism indicating a change in optimal play characteristics of the media file from an original format, wherein current play characteristics of the media file are associated with a first license; in response to detecting the trigger mechanism, instructing a trusted execution environment to request a second streaming format from a content provider of the media file; and upon receiving the media file in the second streaming format, the trusted execution environment enforcing playing of the media file on a local device using a second license for the second streaming format, wherein the second license allows for the playing of the media file to occur at the optimal play characteristics.

Example 27 is the method of Example 26, wherein the content provider provides the second license in response to the request for the second streaming format.

Example 28 is the method of Example 26, wherein the content provider: determines a first portion of the media file played in the original format and a second portion of the media file played in the second streaming format.

Example 29 is the method of Example 28, wherein the content provider: adjusts billing for the media file based on the determined first portion and the determined second portion.

Example 30 is the method of any of Examples 26-29, wherein the trigger mechanism comprises one or more of: a detected change in screen topology, a detected user input indicating a change to the second streaming format, and a detected change in streaming capability between the content provider and the local device.

Example 31 is the method of any of Examples 26-29, wherein the trigger mechanism comprises receiving user input requesting a change in play format.

Example 32 is a machine readable medium including code, when executed, to cause a machine to perform the methods of Examples 26-31.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore be determined with reference to the appended claims, along with the full scope of equivalents to which such claims are entitled.

What is claimed is:

1. A machine readable storage device or storage disc comprising instructions that when executed cause at least one processor to at least:
   detect, while a media file is playing on a local device using a first play characteristic, a trigger indicating a change from the first play characteristic to a second play characteristic, wherein the first play characteristic of the media file is associated with a first license and a first streaming media file format;
   in response to detecting the trigger, instruct a trusted execution environment to:
   transmit an indication of supported display topologies to a content provider of the media file, and
   request the media file in a second streaming media file format from the content provider, the second streaming media file format compatible with at least one of the supported display topologies;
   cause a first indication of a first portion of the media file having been played based on the first license to be transmitted;
   upon receiving the media file in the second streaming media file format, play, in the trusted execution environment, a second portion of the media file on the local device based on a second license for the second streaming media file format; and
   cause a second indication of the second portion of the media file having been played based on the second license to be transmitted.

2. The machine readable storage device or storage disc of claim 1, wherein the local device is to obtain the second license in response to the request for the second streaming format.

3. The machine readable storage device or storage disc of claim 1, wherein the content provider is to adjust billing for the media file based on the determined first portion and the determined second portion.

4. The machine readable storage device or storage disc of claim 1, wherein the trigger includes a change in screen topology.

5. The machine readable storage device or storage disc of claim 1, wherein the trigger includes receiving a user input requesting a change in play format.

6. A system for media play management, the system comprising:
   a trusted execution environment;
   one or more processors; and
   memory including instructions which, when executed by the one or more processors, cause the one or more processors to:
   detect a trigger while a media file is playing using a first play characteristic, the trigger indicating a change from the first play characteristic to a second play characteristic, the first play characteristic associated with a first license and a first streaming media file format;
   cause a first indication of a first portion of the media file having been played based on the first license to be transmitted;
   in response to detecting the trigger, instruct the trusted execution environment to:
   transmit an indication of supported display topologies to a content provider of the media file, and
   request the media file in a second streaming media file format from the content provider, the second streaming media file format compatible with at least one of the supported display topologies;
   upon receiving the media file in the second streaming media file format, play, in the trusted execution environment, a second portion of the media file on the local device based on a second license for the second streaming media file format; and
   cause a second indication of the second portion of the media file having been played based on the second license to be transmitted.

7. The system of claim 6, the one or more processors are to obtain the second license in response to the request for the second streaming media file format.

8. The system of claim 6, wherein the trigger includes one or more of: a change in screen topology, a user input indicating a change to the second streaming media file format, and a change in streaming capability between the content provider and the system.

9. The system of claim 6, wherein the trigger includes a user input requesting a change in play format.

10. A computer readable storage device or storage disc comprising computer readable code which, when executed, causes one or more computer processors to at least:
   in response to a request to stream a media file under a second license from a remote device currently streaming the media file under a first license, provision the second license for the media file based on the request, the first and second licenses associated with first and second file formats, respectively;
   provide the media file to the remote device in the second file format associated with the second license;
   obtain from a trusted execution environment, one or more indications of a first portion of the media file streamed under the first license and a second portion of the media file streamed under the second license; and generate a bill that includes charges for the first portion of the media file streamed under the first license and for the second portion of the media file streamed under the second license.

11. The computer readable storage device or storage disc of claim 10, wherein the first portion of the media file is billed to the remote device at a rate associated with the first license.

12. The computer readable storage device or storage disc of claim 11, wherein the remote device includes a first remote device and a second remote device, and the first portion of the media file was streamed to the second remote device and the second portion was streamed to the first remote device.

13. The computer readable storage device or storage disc of claim 10, wherein the request includes a requested play characteristic, and the second license is determined based on the requested play characteristic.

14. The computer readable storage device or storage disc of claim 13, wherein the requested play characteristic includes a play characteristic for an updated topology.

15. A system for media play management, the system comprising:
   one or more processors; and
   memory including instructions which, when executed, cause at least some of the one or more processors to:
      in response to a request to stream a media file under a second license, received from a remote device currently streaming the media file under a first license, provision the second license for the media file, the first and second licenses associated with first and second file formats, respectively;
      stream the media file to the remote device in the second file format associated with the second license;
      obtain from a trusted execution environment, one or more indications of a first portion of the media file streamed under the first license and a second portion of the media file streamed under the second license; and
      generate a bill that includes first charges for the first portion of the media file streamed under the first license and second charges for the second portion of the media file streamed under the second license.

16. The system of claim 15, wherein the one or more processors are to generate the bill with the first charges at a rate associated with the first license.

17. The system of claim 15, wherein the request includes a requested play characteristic, and the second license is determined based on the requested play characteristic.

18. The system of claim 17, wherein the requested play characteristic includes a play characteristic for a dynamically changing topology.

19. A method for media play management, comprising:
   in response to a request to stream a media file under a second license from a remote device currently streaming the media file in a first format under a first license, provisioning, by executing an instruction with at least one processor, the second license for the media file based on the request;
   obtaining from a trusted execution environment, by executing an instruction with at least one processor, one or more indications of a first portion of the media file streamed under the first license and a second portion of the media file streamed under the second license; and
   generating, by executing an instruction with at least one processor, a bill having a first charge for the streaming of the first portion of the media file under the first license and having a second charge for the streaming of the second portion of the media file under the second license.

* * * * *